US011106342B1

(12) United States Patent
Al Majid et al.

(10) Patent No.: US 11,106,342 B1
(45) Date of Patent: Aug. 31, 2021

(54) USER INTERFACES TO FACILITATE MULTIPLE MODES OF ELECTRONIC COMMUNICATION

(71) Applicant: Snap Inc., Santa Monica, CA (US)

(72) Inventors: Newar Husam Al Majid, Santa Monica, CA (US); Laurent Desserrey, Los Angeles, CA (US); Christie Marie Heikkinen, Santa Monica, CA (US); Nathaniel Parrott, Brooklyn, NY (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/429,904

(22) Filed: Jun. 3, 2019

(51) Int. Cl.
*G06F 3/0484* (2013.01)
*H04L 12/58* (2006.01)
*H04N 7/14* (2006.01)
*G06F 3/0488* (2013.01)
*G06T 11/60* (2006.01)
*H04M 1/7243* (2021.01)

(52) U.S. Cl.
CPC ...... *G06F 3/04845* (2013.01); *G06F 3/04883* (2013.01); *G06T 11/60* (2013.01); *H04L 51/10* (2013.01); *H04M 1/7243* (2021.01); *H04N 7/147* (2013.01); *G06F 2203/04803* (2013.01)

(58) Field of Classification Search
CPC ............. G06F 3/04845; G06F 3/04883; G06F 2203/04803; G06T 11/60; H04N 7/147; H04M 1/72547; H04L 51/10
See application file for complete search history.

(56) References Cited

U.S. PATENT DOCUMENTS 6,757,657 B1 * 6/2004 Kojima ................. G06F 1/1616
704/275
9,185,062 B1 * 11/2015 Yang ..................... G06F 3/0488
(Continued)

FOREIGN PATENT DOCUMENTS

EP        2712165 A1 *  3/2014  ......... H04N 1/32767

OTHER PUBLICATIONS

Nick Hastings, Here's how to use Snapchat filters, so you can jazz up your boring mug, May 31, 2017, 16 pages (Year: 2017).*
(Continued)

*Primary Examiner* — Yongjia Pan
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interfaces to facilitate electronic chat conversations between users via multiple modes of electronic communication. A conversation view is displayed on a touch screen display of a client device. The conversation view presents messages exchanged between a first user and at least one other user in an electronic chat conversation. A user input comprising a touch gesture corresponding to an interaction with the display of the conversation view is received. Based on the user input, a camera feed view is displayed on the touch screen display. The camera feed view comprises a display of image data and enables a user to create a message comprising one or more images. A message is generated, and an indication of the message is displayed in the conversation view.

18 Claims, 16 Drawing Sheets

(56) References Cited

U.S. PATENT DOCUMENTS

| | | | | |
|---|---|---|---|---|
| 9,219,704 | B2* | 12/2015 | Hamlin | H04L 51/36 |
| 9,225,897 | B1* | 12/2015 | Sehn | H04N 1/00244 |
| 9,276,886 | B1* | 3/2016 | Samaranayake | G06F 9/451 |
| 9,391,934 | B2* | 7/2016 | Langholz | G06F 3/16 |
| 10,372,298 | B2* | 8/2019 | Anzures | H04L 51/04 |
| 10,535,177 | B2* | 1/2020 | Cornell | H04L 51/32 |
| 2006/0215242 | A1* | 9/2006 | Besharat | H04N 1/00209 358/540 |
| 2013/0093833 | A1* | 4/2013 | Al-Asaaed | G06F 3/04886 348/14.02 |
| 2013/0147933 | A1* | 6/2013 | Kulas | H04N 21/41407 348/61 |
| 2014/0189606 | A1* | 7/2014 | Shuttleworth | G06F 3/04883 715/863 |
| 2014/0282240 | A1* | 9/2014 | Flynn, III | G06F 9/451 715/810 |
| 2014/0298382 | A1* | 10/2014 | Jo | H04N 5/44582 725/34 |
| 2015/0039706 | A1* | 2/2015 | Zilmer | H04L 51/26 709/206 |
| 2015/0143260 | A1* | 5/2015 | Bailey | G06Q 50/01 715/753 |
| 2016/0011758 | A1* | 1/2016 | Dornbush | H04L 65/601 348/14.03 |
| 2016/0099901 | A1* | 4/2016 | Allen | H04L 51/22 709/206 |
| 2016/0134582 | A1* | 5/2016 | Rubinstein | H04L 63/108 709/206 |
| 2017/0192666 | A1* | 7/2017 | McCarthy | H04N 5/23216 |
| 2017/0223176 | A1* | 8/2017 | Anzures | G06T 13/00 |
| 2017/0336928 | A1* | 11/2017 | Chaudhri | G06F 3/0412 |
| 2018/0329622 | A1* | 11/2018 | Missig | G06F 3/0219 |
| 2018/0336543 | A1* | 11/2018 | Van Os | H04L 67/1078 |
| 2019/0190872 | A1* | 6/2019 | Peiris | G06F 3/04842 |
| 2020/0159394 | A1* | 5/2020 | Chassen | G06F 3/04845 |
| 2020/0293189 | A1* | 9/2020 | Chaudhri | G06F 3/04897 |

OTHER PUBLICATIONS

Andrew Hutchinson, Instagram's Looking to Split Direct Messages into a Separate App, Called 'Instagram Direct', Dec. 8, 2017 6 pages (Year: 2017).*

Amanda Fama, HowTo Get Halloween Filters On Facebook Messenger For Spooky Video Chats With Friends, Oct. 23, 2017, 13 pages (Year: 2017).*

Dave Parrack, Facebook Messenger Adds New Camera Tricks, Dec. 18, 2018, 5 pages (Year: 2018).*

How to access camera with swiping gesture?, Dec. 4, 2016, 2 pages (Year: 2016).*

UIViewController, accessed Jan. 1, 2021, 6 pages (Year: 2021).*

Very choppy, slow page turn after instantiating a page in UIPageViewController, Aug. 20, 2015, 2 pages (Year: 2015).*

Why am I getting this error after running my PageViewController?, Oct. 30, 2015, 3 pages (Year: 2015).*

On left-to-right swipe, open camera from left of screen smoothly. How to achieve this?, Feb. 15, 2018, 3 pages (Year: 2018).*

IOS Push UIViewControlleron slide gesture like Snapchat, Nov. 6, 2014, 2 pages (Year: 2014).*

Using Pan gesture recognizer to bring down a view controller, Feb. 10, 2017, 2 pages (Year: 2017).*

IOS Interactive Animation Swift, Oct. 6, 2016, 5 pages (Year: 2016).*

Artur Chabera, Reproducing Snapchat's Navigation on iOS—Part 2, Mar. 26, 2019, 11 pages (Year: 2019).*

Very specific swipe pattern on a UIPageViewController breaks my entire app, Nov. 17, 2017, 4 pages (Year: 2017).*

Implement Facebook messenger style pan to full screen view similar effect, Nov. 13, 2014, 13 pages (Year: 2014).*

* cited by examiner

USER INTERFACES TO FACILITATE MULTIPLE MODES OF ELECTRONIC COMMUNICATION

TECHNICAL FIELD

The present disclosure generally relates to facilitating electronic communication between users. In particular, example embodiments of the present disclosure address systems, methods, and user interfaces to facilitate communication between users via multiple modes of electronic communication.

BACKGROUND

Social media applications, such as online chat applications, allow users to exchange messages with one another. These applications often provide a graphical interface from which a user can send and receive text-based messages exchanged as part of an electronic chat conversation with other users. Often these applications run on mobile and other electronic devices that are capable of facilitating other modes of electronic communication such as those involving voice or video content.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Description

Figure 1:
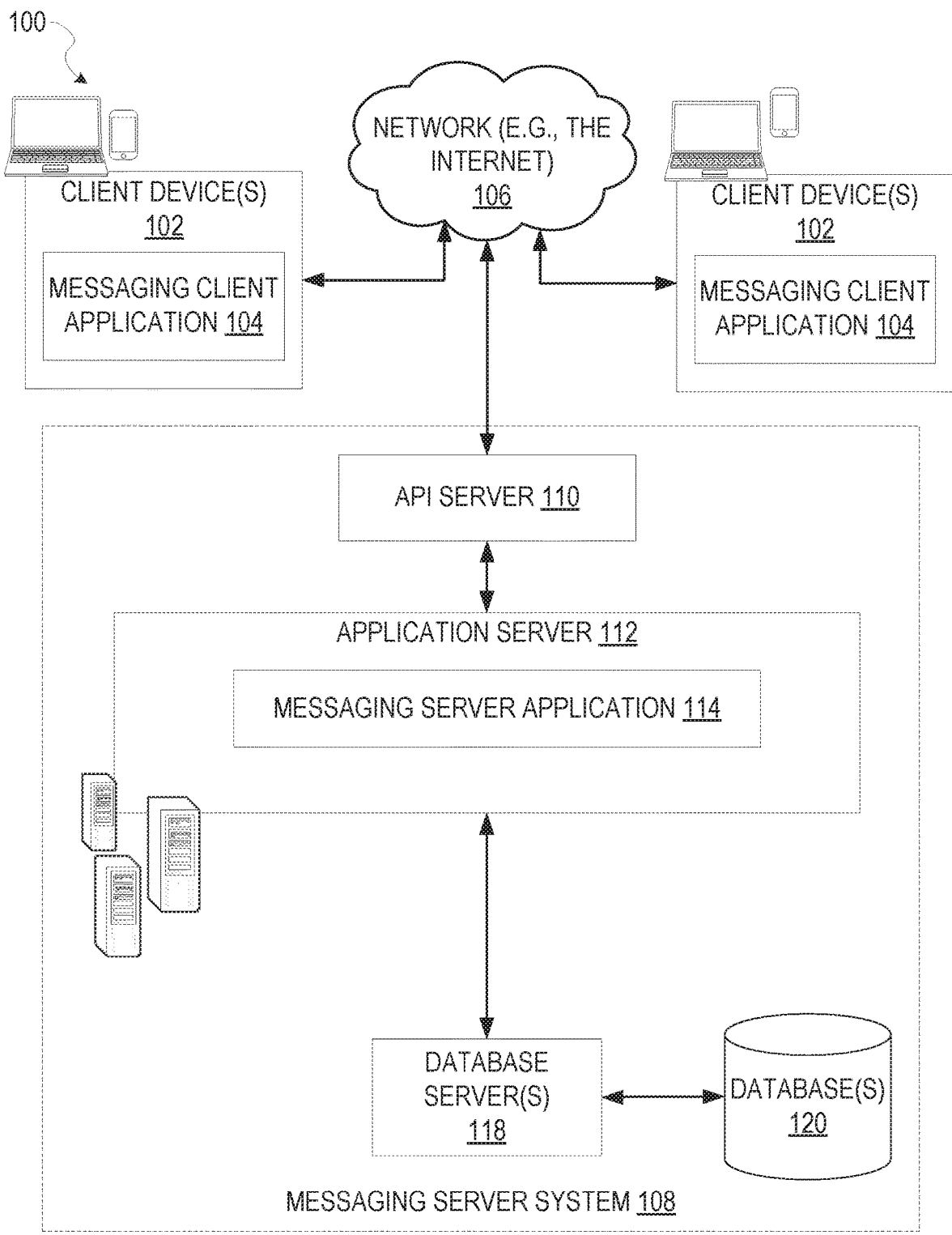
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As noted above social media applications often provide a graphical interface from which a user can send and receive text-based messages exchanged as part of an electronic chat conversation with other users. However, the graphical interfaces of these applications typically do not allow users to seamlessly transition from one mode of communication to another. For many of these types of applications, a user participating in an electronic chat conversation who wishes to transition between sending text-based messaging to audio-based and video-based messaging typically needs to find the appropriate buttons or other interactive element to navigate to other windows or interfaces that facilitate such communication. In other instances, a user may need to exit the application altogether, and navigate to another application that facilitates audio- and/or video-based messaging.

Aspects of the present disclosure include facilitating electronic chat conversation between users via multiple modes of electronic communication. To address the shortcomings of conventional social media applications described above, a messaging system is configured to facilitate communication via text, voice, and video. To facilitate communication via these multiple modes of communication, the messaging system provides an interactive messaging interface that includes multiple views, each of which enables communication between users via one or more modes of communication. As used herein, a "view" is a component of a user interface that includes an output representation of information in a particular format. Each of the multiple views of the interactive messaging interface may present different information or multiple views may present the same or similar information in different formats. Further, each of the multiple views may provide or enable different functionality with respect to the messaging system.

As an example, the messaging interface of the messaging system includes a conversation view that allows users to author and send text-based messages exchanged as part of an electronic chat conversation between users. The conversation view also allows users to view messages exchanged as part of the electronic chat conversation.

A camera feed view of the messaging interface displays image data generated by a camera of a device on which the camera feed view is displayed. The image data depicts a real-world scene that is visible within a field of view of the camera. The camera feed view allows a user to create image-based messages for submission to the electronic chat conversation. The image-based messages comprise image data generated by the camera as well as audio data generated by a microphone of the device, in some instances. The camera feed may also allow the user to apply one or more visual effects to the image data while creating the message.

The messaging system enables users to quickly and easily toggle between the conversation view and the camera feed view thereby enabling users to easily communicate within the electronic chat conversation according to multiple modes of electronic communication. Consistent with some embodiments, users may toggle between the conversation view and the camera feed view by simply performing a touch gesture interaction with a touch screen display on which the user interface is displayed. For example, users may toggle from the display of the conversation view to the camera feed view by swiping across the touch screen display from left to right and may return to the display of the conversation view by swiping across the touch screen display from right to left. By allowing users to toggle between these views in this convenient manner, the messaging system improves the operation of computing devices (e.g., those executing conventional social media applications) by reducing interface actions by providing an interactive interface that allows users to quickly and easily switch between modes of communication without having to navigate between numerous intervening windows or interfaces and without needing to switch between multiple applications or devices. Hence, the messaging system provides an improvement to computer technology by virtue of an improved user interface.

DRAWINGS

FIG. 1 is a block diagram showing an example messaging system 100 for exchanging data (e.g., messages and associated content) over a network 106. The messaging system 100 includes multiple client devices 102, each of which hosts a number of applications including a messaging client application 104. In example embodiments, each client device 102 comprises at least a camera, a microphone, and a touch screen display. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding of friends to and deletion of friends from a social graph; the location of friends within a social graph; and opening an application event (e.g., relating to the messaging client application 104).

The application server 112 hosts a messaging server application 114 that implements a number of message processing technologies and functions. Other processor- and memory-intensive processing of data may also be performed server-side by the messaging server application 114, in view of the hardware requirements for such processing.

Figure 2:
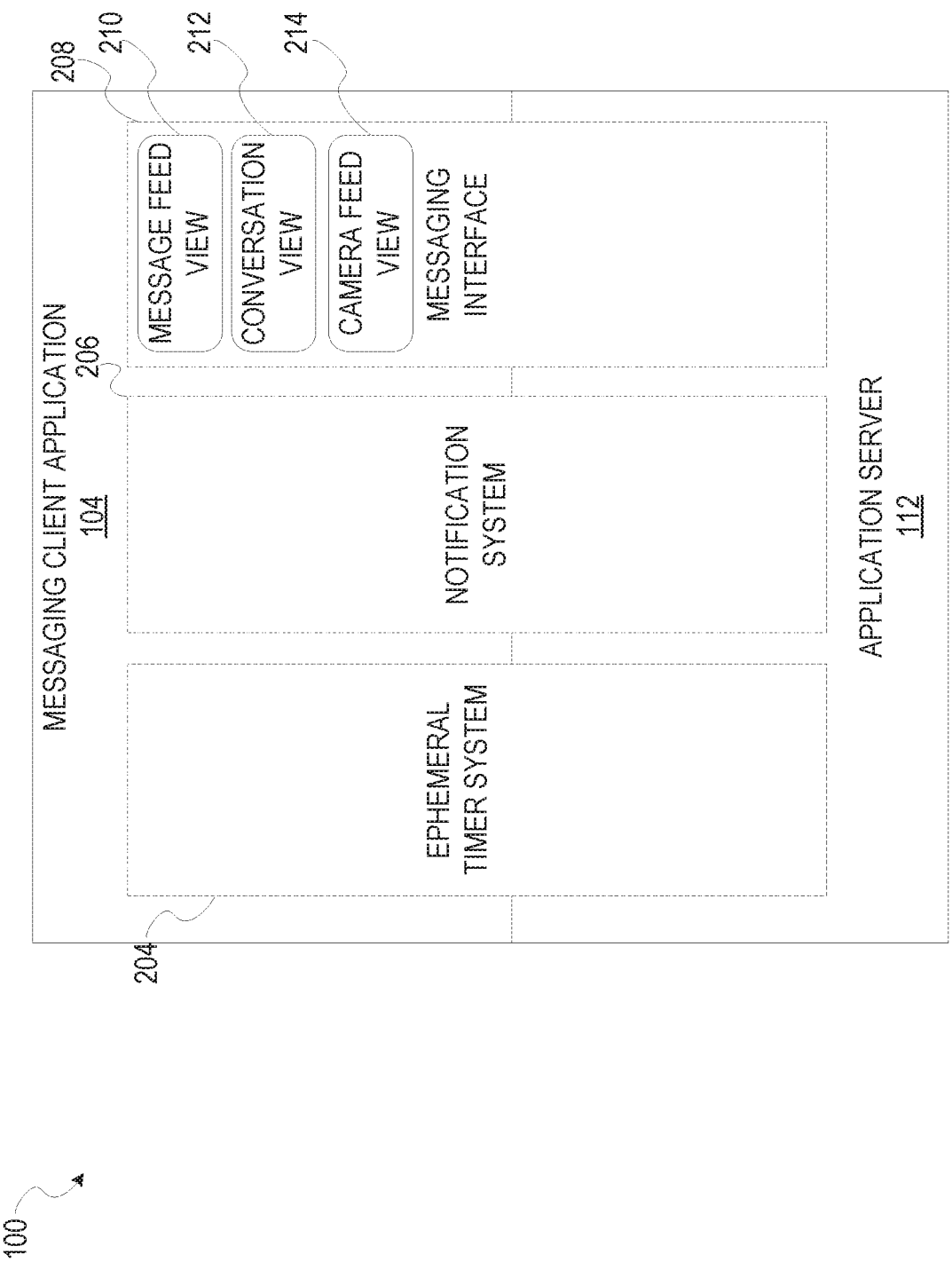
FIG. 2 is a block diagram illustrating further details regarding the messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 204 and a notification system 206. The messaging system 100 also includes a messaging interface 208 that includes a message feed view 210, a conversation view 212, and an camera feed view 214.

The message feed view 210 presents indicators of chat conversations in which a user is a participant. Each chat conversation indicator may be selected to access a conversation view 212 that enables a user to author, send, and view messages of the chat conversation. Each message presented in the conversation view 212 may be presented with a read indicator that indicates whether the message has been read by the receiving user. In some instances, upon a message being read by the receiving user, the read indicator may be replaced with an indicator of remaining time available for accessing the message. The camera feed view 214 includes a display of image data generated by a camera of the client device 102. The image data includes one or more images depicting a real-world screen that is visible within the camera's field of view. The camera feed view 214 allows a user to create messages comprising one or more images as well as audio data, in some instances. The camera feed view 214 may provide functionality to the user to allow the user to apply one or more visual effects (e.g., filters) to the one or more images as part of creating the message. Further details regarding the conversation view 212 and camera feed view 214 are discussed below.

The ephemeral timer system 204 is responsible for enforcing message durations for messages exchanged within the context of the messaging system 100. To this end, the ephemeral timer system 204 incorporates a number of timers that, based on retention duration attributes associated with a chat conversation, selectively display and enable access to messages and associated content via the messaging client application 104. Further details regarding the operation of the ephemeral timer system 204 are provided below.

The notification system 206 is responsible for providing notifications related to the exchange of messages within the context of the messaging system 100. The notification system 206 may, for example, provide notifications of newly initiated chat conversations and newly received messages. The notification system 206 may also provide notifications of incoming voice or video calls. In an example, the notification system 206 may cause display of a notification within the message feed view 210 of an incoming call (e.g., voice or video) associated with a chat conversation.

Figure 3:
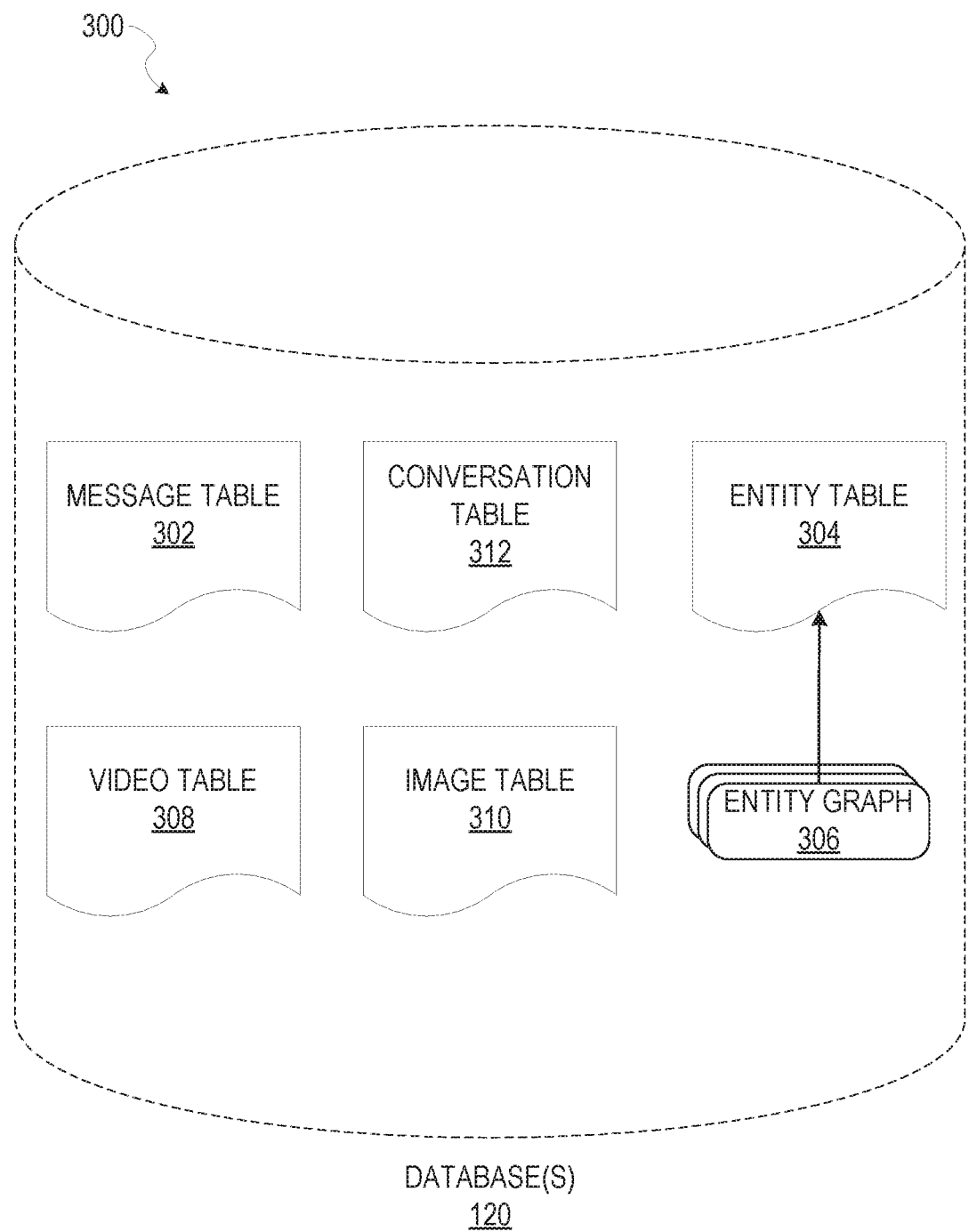
FIG. 3 is a schematic diagram illustrating data which may be stored in a database of a messaging server system, according to example embodiments.

FIG. 3 is a schematic diagram illustrating data 300 which may be stored in the database(s) 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 302. An entity table 304 stores entity data, including an entity graph 306. Entities for which records are maintained within the entity table 304 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 306 furthermore stores information regarding relationships and associations between entities. Such relationships may be social, professional (e.g., work at a common corporation or organization), interested-based, or activity-based, merely for example.

A video table 308 stores video data associated with messages for which records are maintained within the message table 302. Similarly, an image table 310 stores image data associated with messages for which message data is stored in the message table 302.

A conversation table 312 stores data regarding chat conversations and associated content (e.g., image, video, or audio data). A record for each chat conversation may be maintained in the conversation table 312. Each record may include a unique identifier for the chat conversation, a retention duration attribute, identifiers of entities that are participants in the chat conversation (or pointers to the identifiers in the entity table 304), and message data (or pointers to corresponding message data in the message table 302).

Figure 4:
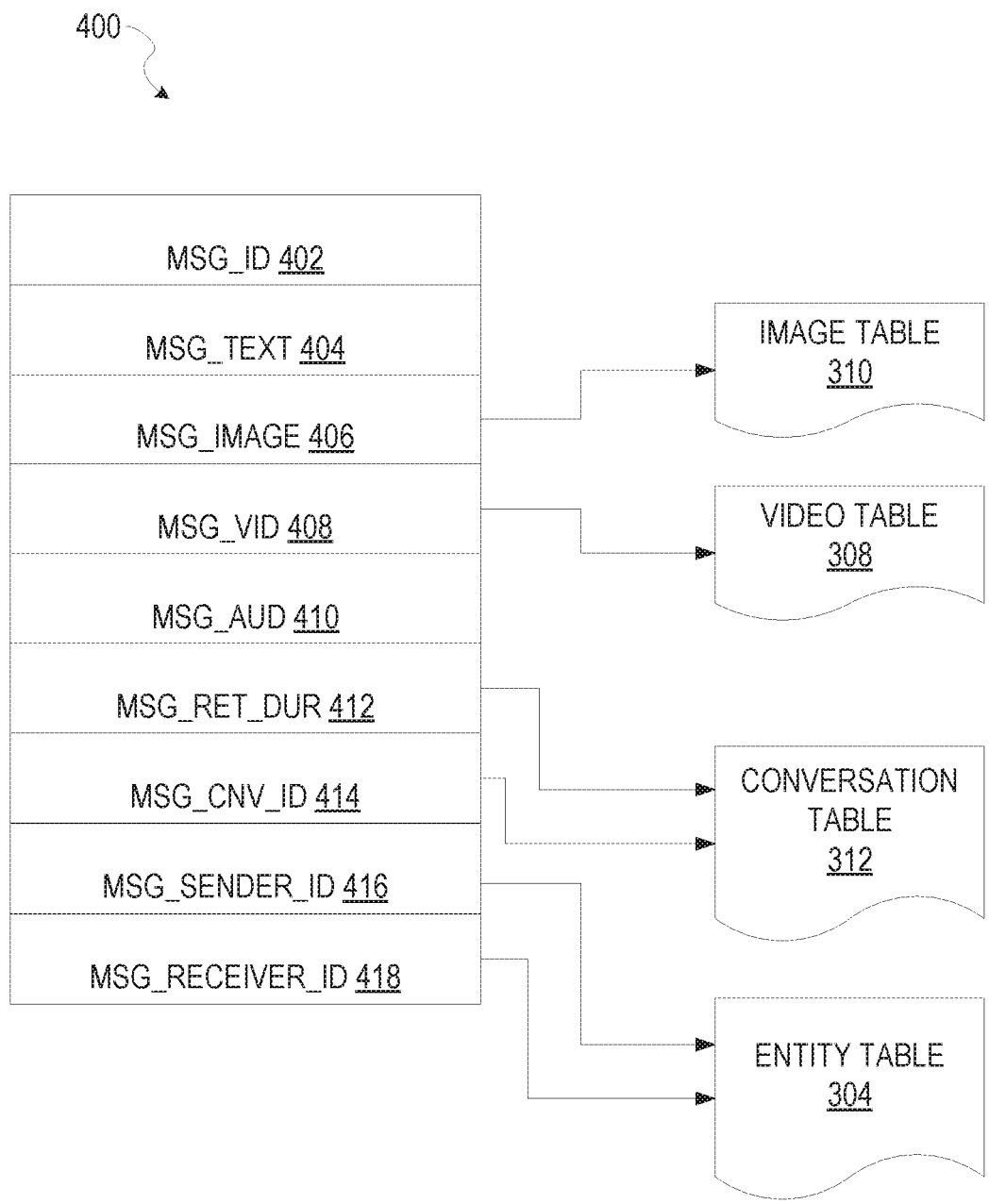
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 302 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of the client device 102 or retrieved from memory of the client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message duration attribute 412: an attribute value indicating, in seconds, the amount of time for which content of the message 400 (e.g., the message image payload 406, message video payload 408, and message audio payload 410) is to be made accessible to a user via the messaging client application 104 upon accessing the message 400.

A conversation identifier 414: an identifier indicative of the chat conversation to which the message belongs.

A message sender identifier 416: an identifier (e.g., a messaging system identifier, email address, or device identifier) indicative of a user of the client device 102 on which the message 400 was generated and from which the message 400 was sent.

A message receiver identifier 418: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 310. Similarly, values within the message video payload 408 may point to data stored within a video table 308, values stored within the conversation identifier 414 may point to data stored within the conversation table 312, and values stored within the message sender identifier 416 and the message receiver identifier 418 may point to user records stored within an entity table 304.

Figure 5:
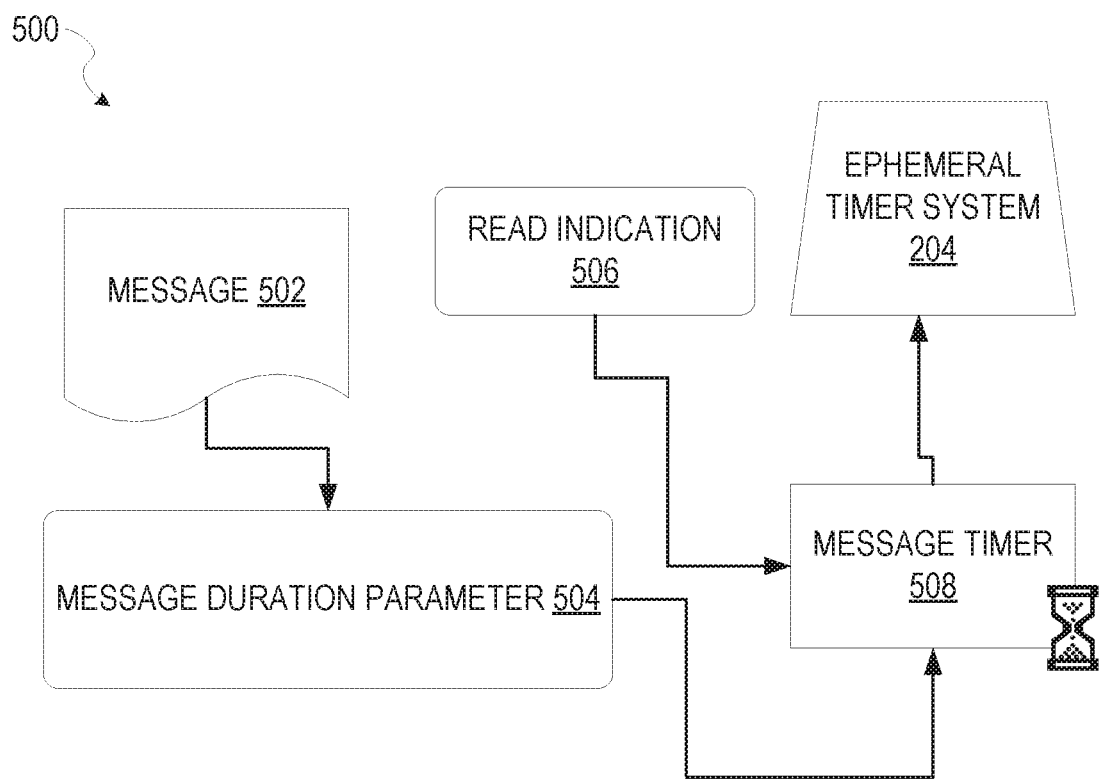
FIG. 5 is a schematic diagram illustrating an example access-limiting process, in terms of which access to content (e.g., an ephemeral message, and associated multimedia payload of data) may be time-limited (e.g., made ephemeral), according to example embodiments.

FIG. 5 is a schematic diagram illustrating an access-limiting process 500, in terms of which access to content (e.g., a message 502, and associated multimedia payload of data) may be time-limited (e.g., made ephemeral).

A message 502 is shown to be associated with a message duration parameter 504, the value of which determines an amount of time that the message 502 will be made accessible by the messaging client application 104 upon being read by a receiving user. In one example, the message 502 is accessible for 24 hours upon being read by the receiving user.

The message duration parameter 504 (e.g., the value of the message duration attribute 412) and a read indication 506 are shown to be inputs to a message timer 508, which is responsible for determining the amount of time that the message 502 is made accessible to the participants of the chat conversation identified by the message sender identifier 416 and the message receiver identifier 418. In particular, the message 502 will only be accessible to the relevant users for a time period determined by the value of the message duration parameter 504 after the message 502 has been read by the relevant receiving user. The time period may be based on a message receipt time. The read indication 506 may be triggered by the receiving user accessing the chat conversation in which the message 502 was received, by the receiving user confirming that the message 502 has been read, when the message 502 has been displayed on a screen for a threshold amount of time, or via any other such system for determining that the message 502 has been read.

The message timer 508 is shown to provide output to a more generalized ephemeral timer system 204, which is responsible for the overall timing of display of content (e.g., the message 502) to a receiving user. When the ephemeral timer system 204 determines that the retention duration specified by the message duration parameter 504 for a particular message 502 has expired after receiving the read indication 506, the ephemeral timer system 204 causes the message 502 to be erased from memory. Further, the ephemeral timer system 204 causes the messaging client application 104 to no longer display an indicium (e.g., an icon or textual identification) associated with the message 502.

Figure 6A:
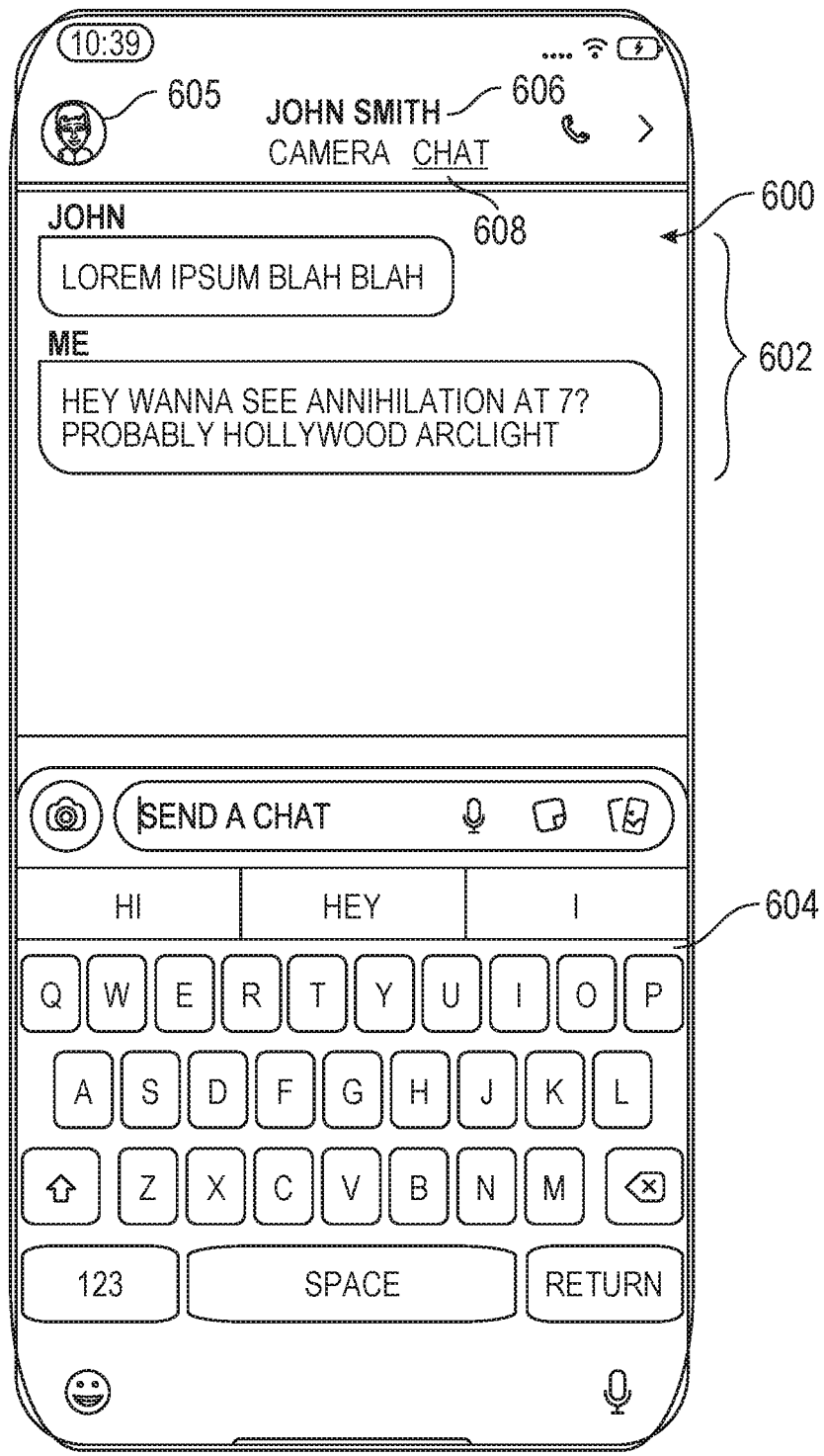
FIGS. 6A-6G are interface diagrams illustrating aspects of graphical user interfaces (GUIs) provided by the messaging system, according to example embodiments.

FIGS. 6A-6G are interface diagrams illustrating aspects of GUIs provided by the messaging system 100, according to example embodiments. In the context of FIGS. 6A-6G, two users are engaged in an electronic chat conversation. FIG. 6A illustrates a conversation view 600 as displayed on the client device 102 of a first user of the group of users (identified as "Me" within the conversation view 212). The conversation view 600 is an example of the conversation view 212.

The conversation view 600 presents text-based messages 602 exchanged between the two users as part of the electronic chat conversation. The first user may submit text-based messages to the electronic chat conversation using a keyboard 604 included within the conversation view 600. Messages submitted by the first user are displayed within the conversation view 600 displayed on the client device 102 of the first user along with messages submitted by a second user (identified as "John"). These messages are also displayed within a conversation view 212 presented on the devices of the other participating users.

As shown, the conversation view 600 displays a graphical representation 605 (e.g., an avatar or a Bitmoji) of the second user participating in the chat conversation. The graphical representation 605 of the second user is presented in conjunction with an identifier 606 of the second user. The conversation view 600 also includes a status indicator 608 to indicate that the conversation view 600 is currently being displayed.

The conversation view 600 also includes an input bar that includes multiple interactive elements (e.g., buttons) that allow the first user to switch from communicating with the second user using the text-based mode of communication to another mode of communication such as a voice call.

From the conversation view 600, a user may provide input to toggle the GUI provided by the messaging system 100 from displaying the conversation view 600 to displaying a camera feed view 650. For example, the user may perform a touch gesture interaction with the conversation view 600, such as a screen swipe, to toggle to the camera feed view 650.

Figure 6B:
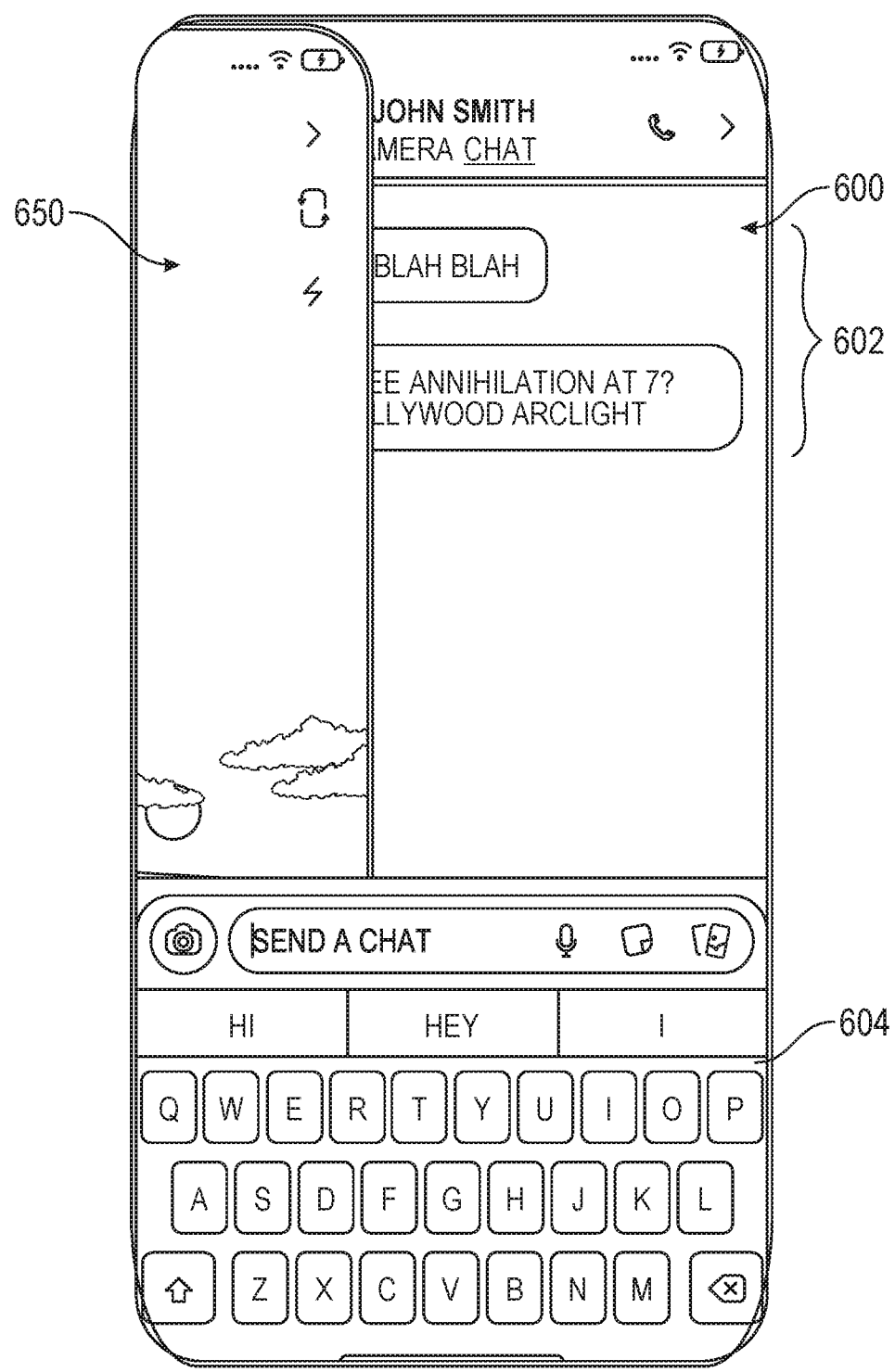
Figure 6C:
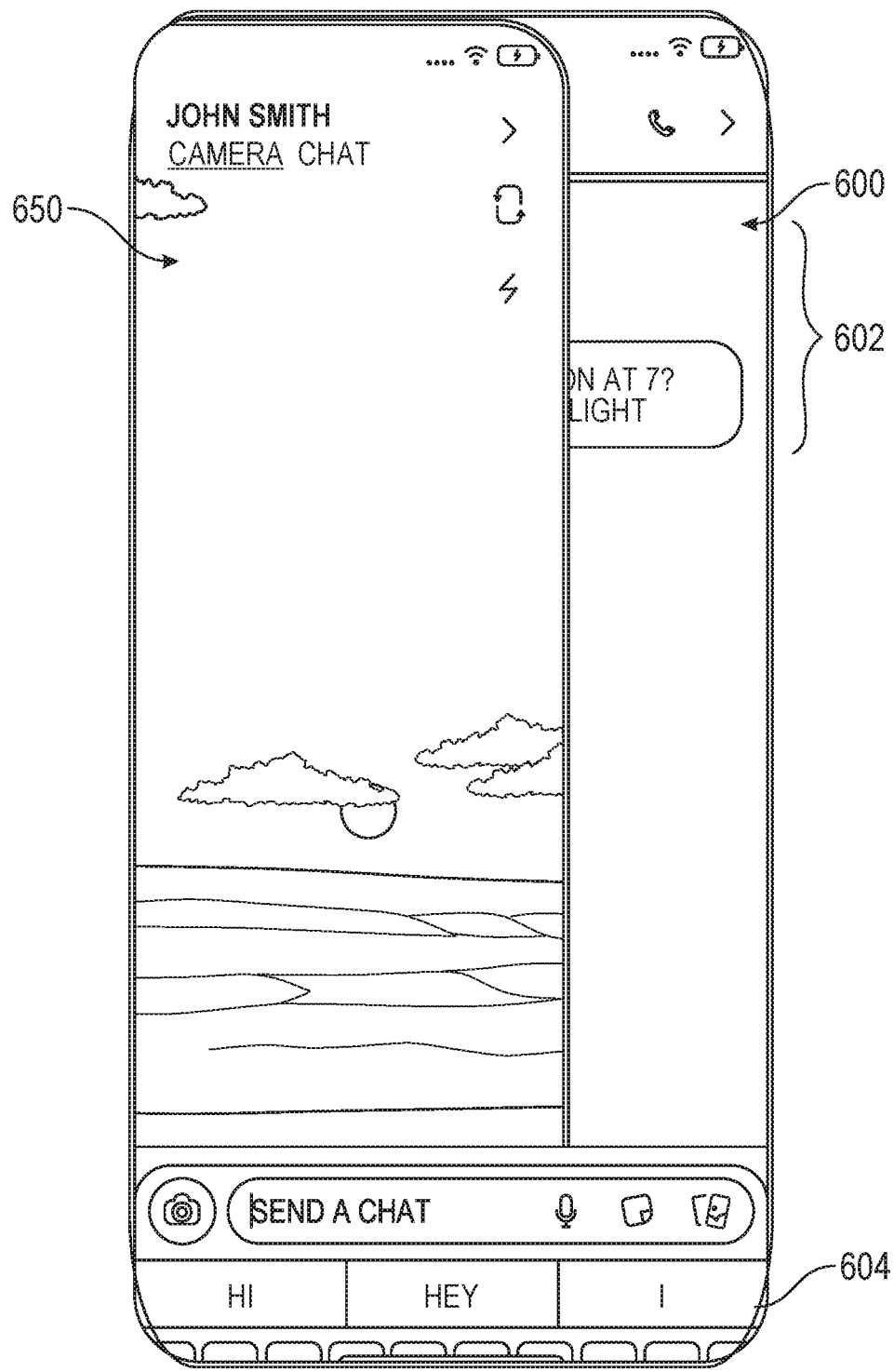

As shown in FIGS. 6B and 6C, upon receiving the user input, the messaging system 100 may cause display of an animation of a transition between the conversation view 600 and the camera feed view 650. In the example illustrated in FIGS. 6B and 6C, the messaging system 100 causes the display of the camera feed view 650 to slide across the touch screen display of the client device 102 over the display of the conversation view 600 until the conversation view 600 is completely obscured and the camera feed view 650 is fully visible. In some embodiments, the messaging system 100 may cause the display of the camera feed view 650 to slide across the touch screen display of the client device 102 in a manner that makes the display of the camera feed view 650 appear to follow the user's finger as it slides across the touch screen display. In some embodiments, the messaging system 100 may cause the display of the camera feed view 650 to slide over the messages 602 of the conversation view 600 while causing the display of the keyboard 604 of the conversation view 600 to slide down the touch screen display until the keyboard 604 is completely out of view, as illustrated in FIGS. 6B and 6C.

Figure 6D:
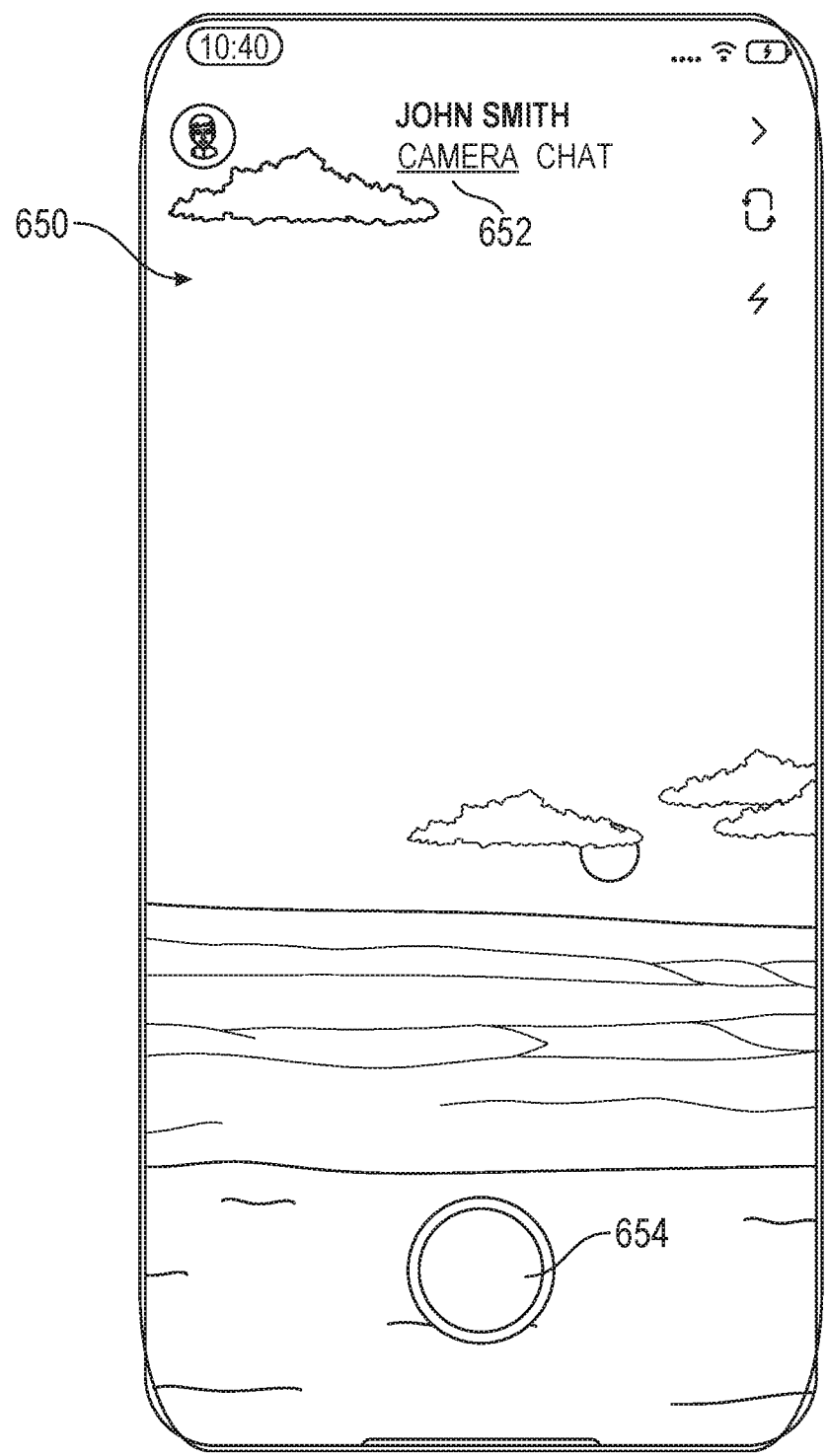

FIG. 6D illustrates an example of the camera feed view 650. As noted above, the messaging system 100 may cause display of the camera feed view 650 responsive to user input comprising a touch gesture interaction with the conversation view 600. The example camera feed view 650 includes a display of image data generated by a camera of the client device 102. The image data comprises one or more images depicting a real-world scene that is within a field of view of the camera. The camera feed view 650 includes a status indicator 652 to indicate that the camera feed view 650 is currently being displayed.

The camera feed view 650 enables a user to create a message comprising image data generated by the camera for submission to the electronic chat conversation. For example, the camera feed view 650 includes a button 654 to trigger the messaging system 100 to generate a message comprising image data generated by the camera and displayed within the camera feed view 650. The message may also include audio data recorded by one or more microphones of the client device 102. The camera feed view 650 may further provide functionality to enable the user to apply one or more visual effects to the image data as part of creating the message.

Figure 6E:
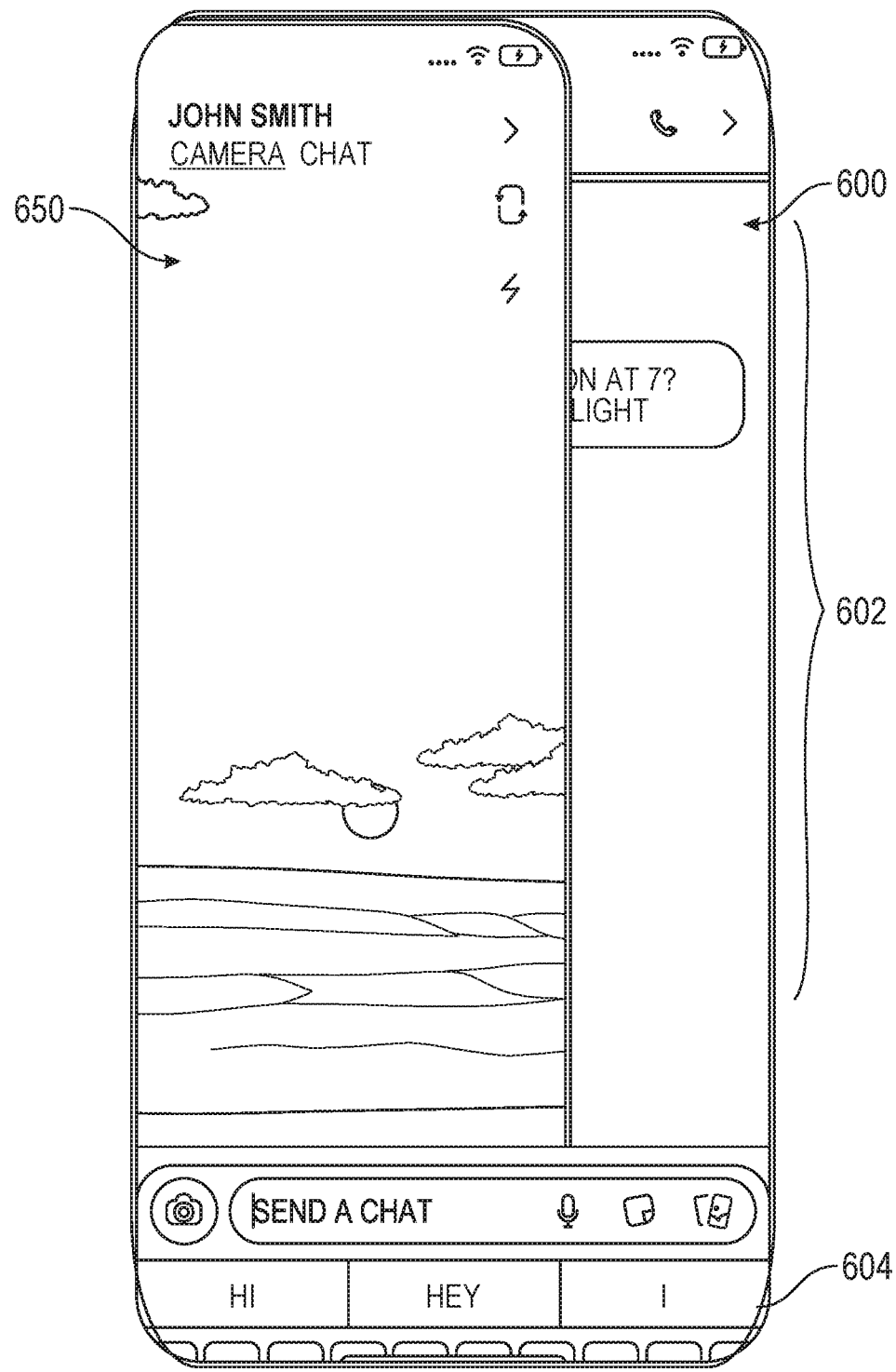
Figure 6F:
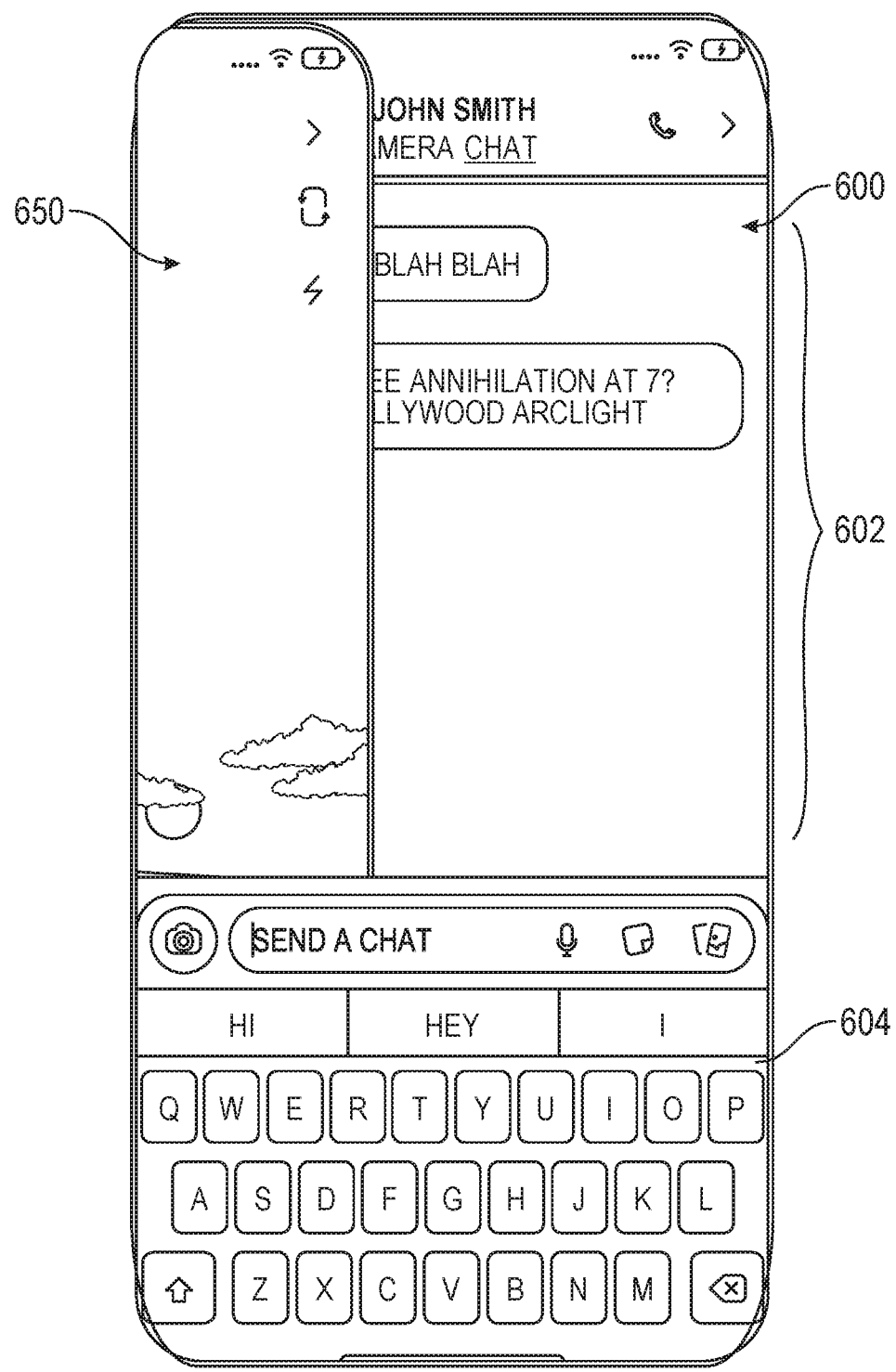

Upon generating a message or receiving further input corresponding to a touch gesture interaction (e.g., a swipe) with the camera feed view 650, the messaging system 100 transitions back to the display of conversation view 600. For example, as shown in FIGS. 6E and 6F, the messaging system 100 may cause display of an animation of the transition wherein the display of the camera feed view 650 again slides across the touch screen display—this time in the opposite direction—revealing portions of the display of the conversation view 600 until the camera feed view 650 is out of view and the display of the messages 602 and keyboard 604 of the conversation view 600 are fully visible.

Figure 6G:
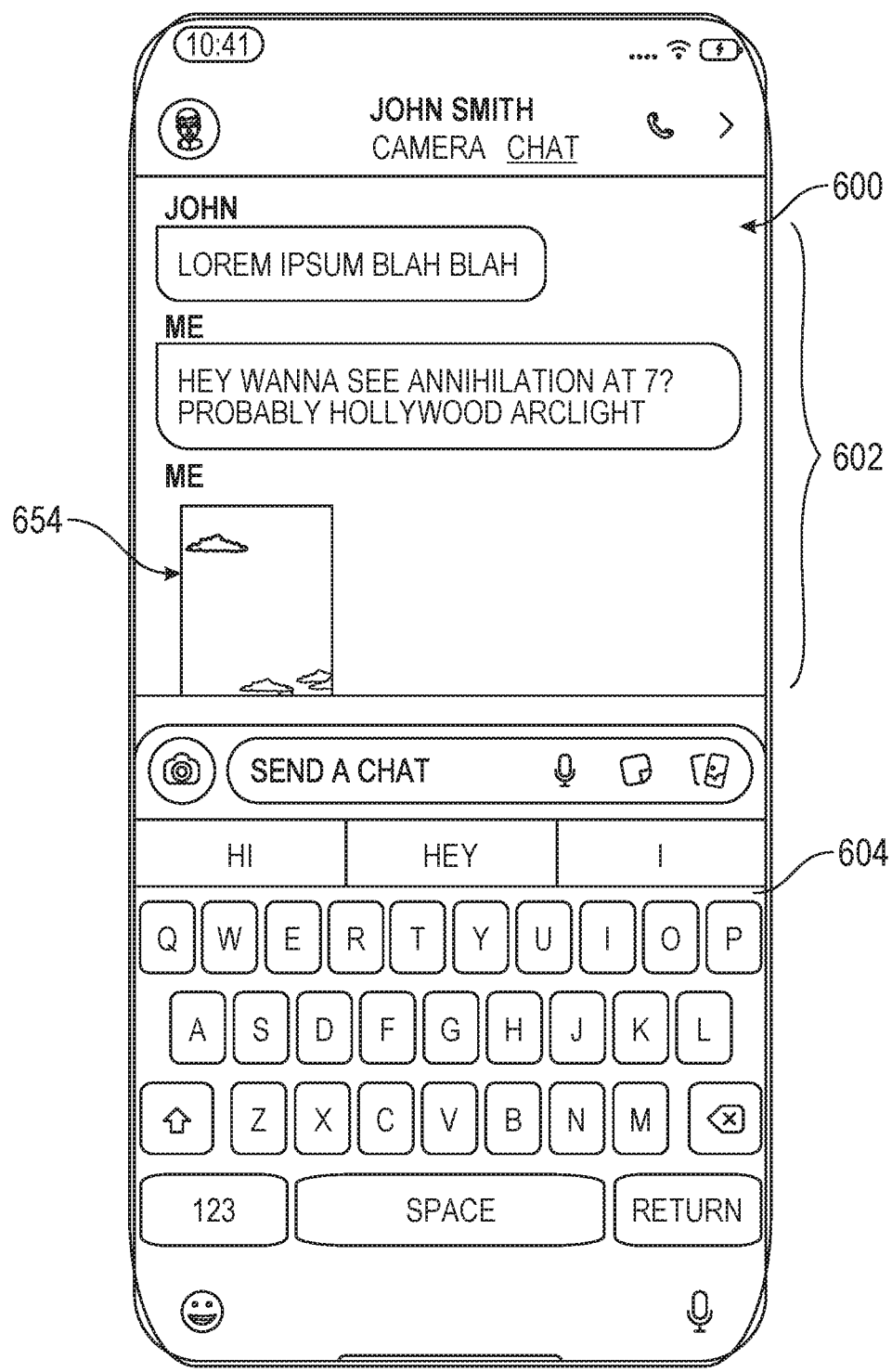

As shown in FIG. 6G, an indication 654 of a message generated using functionality accessed from the camera feed view 650 is presented within the conversation view 600.

Figure 7:
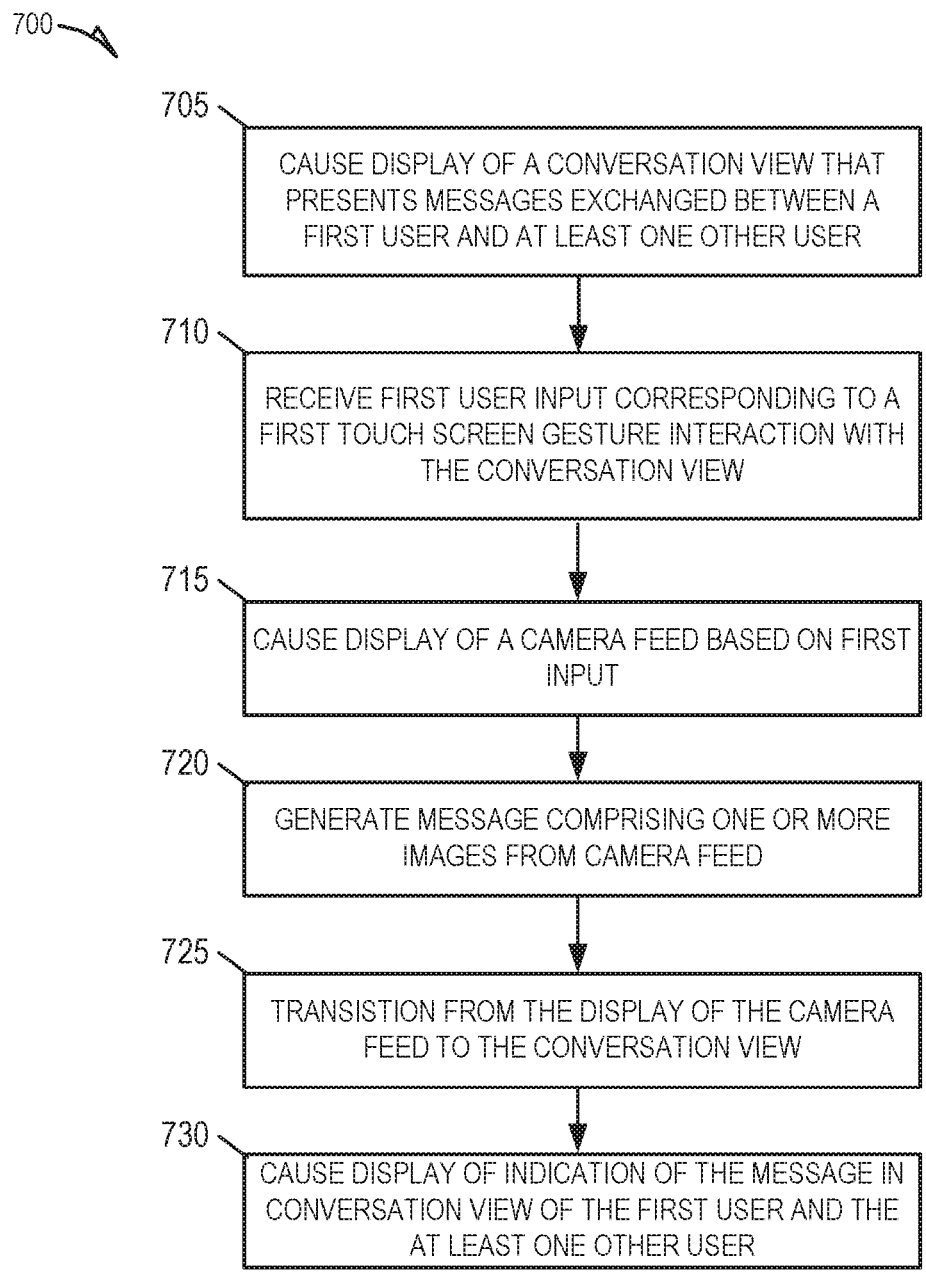
FIGS. 7 and 8 are flowcharts illustrating operations of the messaging system in performing a method for toggling between a conversation view and a camera feed view, according to example embodiments.
Figure 8:
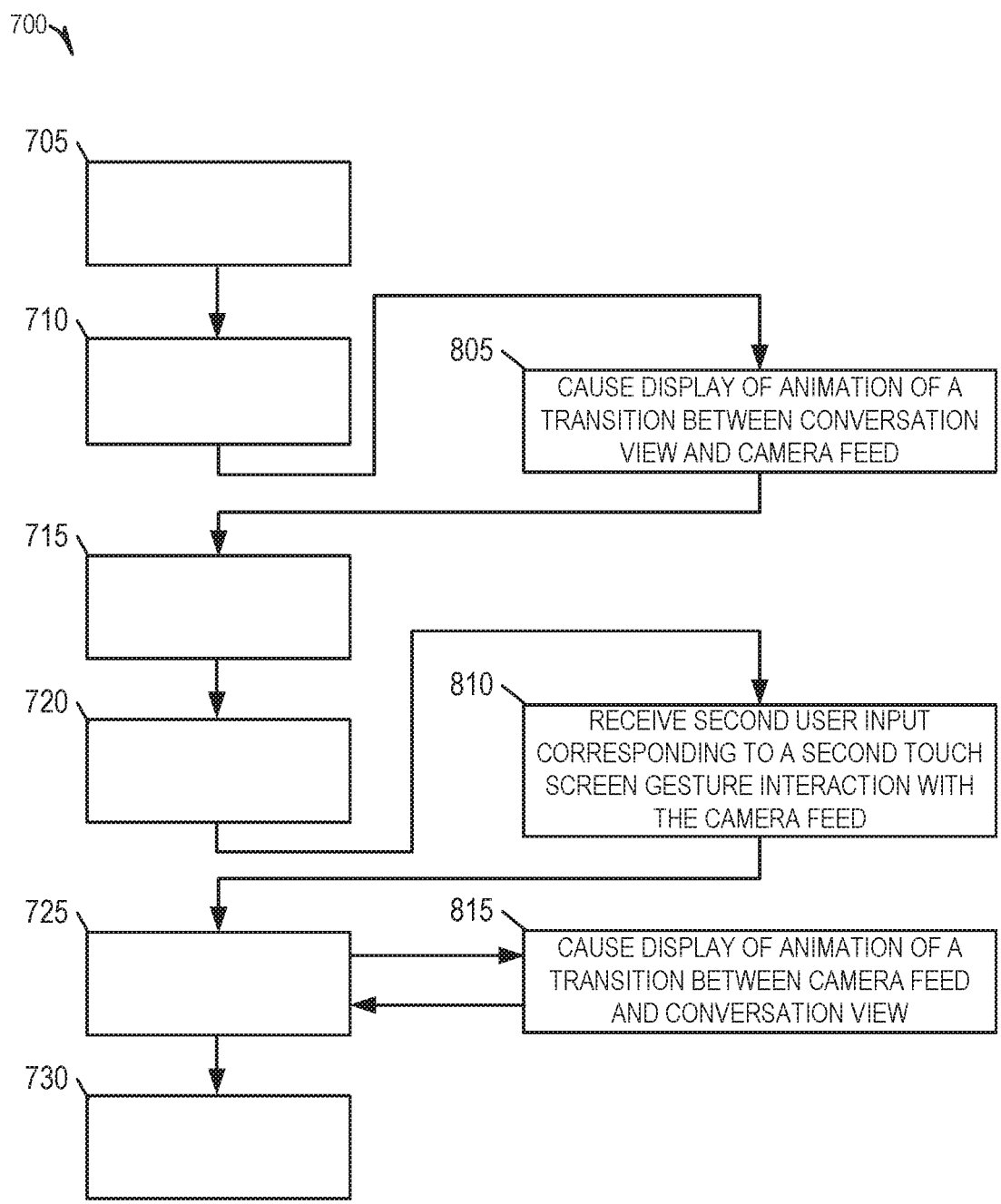

FIGS. 7 and 8 are flowcharts illustrating operations of the messaging system in performing a method 700 for toggling between a conversation view and a camera feed view, according to example embodiments. The method 700 may be embodied in computer-readable instructions for execution by one or more processors such that the operations of the method 700 may be performed in part or in whole by the functional components of the messaging system 100; accordingly, the method 700 is described below by way of example with reference thereto. However, it shall be appreciated that at least some of the operations of the method 700 may be deployed on various other hardware configurations than the messaging system 100.

At operation 705, the messaging system 100 causes display of the conversation view 212 (e.g., the conversation view 600) on a display of a client device 102 associated with a first user. The conversation view 212 presents messages exchanged between the first user and at least one other user in an electronic chat conversation. The conversation view 212 further includes a keyboard to author messages for submission to the electronic chat conversation. The conversation view 212 may further include at least one identifier (e.g., identifier 606) corresponding to the at least one other user participating in the electronic chat conversation. The conversation view 212 may further include a status indicator to indicate that the conversation view 212 is being displayed.

At operation 710, the messaging system 100 receives a first user input corresponding to an interaction with the display of the conversation view 212. Specifically, the interaction with the conversation view 212 comprises a touch gesture corresponding to an interaction with the display of the conversation view 212. For example, the touch gesture interaction may comprise a finger swipe across a touch screen display of the client device (e.g., left-to-right, right-to-left, top-to-bottom, or bottom-to-top) displaying the conversation view 212.

At operation 715, the messaging system 100 causes display of the camera feed view 214 in response to receiving the first user input. The camera feed view 214 comprises a display of image data generated by the camera of the client device 102. The camera feed view 214 may also include a status indicator to indicate that the camera feed view 214 is being displayed. In this manner, a user may reach the camera feed view 214 directly from the conversation view 212.

The camera feed view 214 enables a user of the client device 102 to create a message comprising one or more images from the image data generated by the camera. For example, the camera feed view 214 may include an interactive element (e.g., button) for a user to initiate and terminate generation of the message. The camera feed view 214 may further enable the first user to create the message by enabling the first user to augment the display of the one or more images with one or more visual effects. For example, the camera feed view 214 may include one or more interactive elements that enable the first user to select the one or more visual effects from a set of visual effects and the messaging system 100 applies selected visual effects to the image data and resulting augment images may be recorded as part of generating the message.

At operation 720, the messaging system 100 generates a message comprising one or more images from the camera feed view 214. The generating of the message may be in response to user input indicative of a selection of an interactive element (e.g., a button) included in the camera feed view 214. The generating of the message may include recording (e.g., storing in memory) one or more images generated by the camera. The message may further include one or more user selected visual effects applied to the one or more images. Accordingly, the generating of the message may include applying the one or more user selected visual effects to the one or more images. The message may further include audio data recorded by a microphone of the client device 102 coincidentally with the recording of the one or more images from the camera feed view 214.

At operation 725, the messaging system 100 transitions from displaying the camera feed view 214 to displaying the conversation view 212. The messaging system 100 may transition the display in response to the generation of the message being complete or in response to further user input (e.g., a touch gesture such as a swipe). In transitioning from displaying the camera feed view 214 to displaying the conversation view 212, the messaging system 100 may cause display of an animation on the client device 102 of the transition between the display of the conversation view 212 and the camera feed view 214.

At operation 730, the messaging system 100 causes display of an indication of the message in the conversation view 212 displayed on the client device 102 of the first user and in the conversation view 212 displayed on at least one other client device 102 corresponding to the at least one other user.

As shown in FIG. 8, the method 700 may further include operations 805, 810, and 815, in some embodiments. Consistent with these embodiments, the operation 805 may be performed responsive to the first user input received at operation 710. At operation 805, the messaging system 100 causes display of an animation of a transition between the conversation view 212 and the camera feed view 214. In some embodiments, the animation comprises the display of the camera feed view 214 sliding across the touch screen display of the client device 102 on top of at least a portion of the display of the conversation view 212.

The sliding of the display of the camera feed view 214 may be responsive to the first input. For example, the messaging system 100 may cause the display of the camera feed view 214 to slide across the touch screen display of the client device 102 such that the display of the camera feed view 214 appears to follow the first user's finger across the touch screen display of the client device 102.

In some embodiments, the messaging system 100 causes the display of the camera feed view 214 to slide across the display of the one or more messages of the conversation view 212. Consistent with these embodiments, the messaging system 100 causes the display of the keyboard of the conversation view 212 to slide across the touch screen display of the client device 102 out of view. The messaging system 100 may cause the display of the keyboard to slide across the touch screen display of the client device 102 in the same, opposite, or perpendicular direction of the direction of the sliding of the camera feed view 214. For example, the animation of the transition may include causing the display of the camera feed view 214 to slide across the touch screen display from left to right while the keyboard slides down across the touch screen display until it is out of view.

Operation 810 may, in some embodiments, be performed prior to operation 725, where the messaging system 100 transitions, on the client device 102, from the display of the camera feed view 214 to the display of the conversation view 212. At operation 810, the messaging system 100 receives a second user input corresponding to an interaction with the display of the camera feed view 214. Specifically, the interaction with the camera feed view 214 comprises a second touch gesture corresponding to an interaction with the display of the camera feed view 214. For example, the touch gesture interaction may comprise a finger swipe across a touch screen display of the client device 102 (e.g., left-to-right, right-to-left, top-to-bottom, or bottom-to-top).

Operation 815 may, in some embodiments, be performed as part of (e.g., a sub-operation or sub-task) operation 725, where the messaging system 100 transitions, on the client device 102, from the display of the camera feed view 214 to the display of the conversation view 212. At operation 815, the messaging system 100 causes display of an animation of a transition between the camera feed view 214 and the conversation view 212. In some embodiments, the animation comprises the display of the camera feed view 214 sliding across the touch screen display of the client device 102 (e.g., in an opposite direction than at operation 805) revealing portions of the display of the conversation view 600 until the camera feed view 650 is out of view and the display of the messages 602 and keyboard 604 of the conversation view 600 are fully visible. The sliding of the display of the camera feed view 214 may be responsive to the second input. For example, the messaging system 100 may cause the display of the camera feed view 214 to slide across the touch screen display of the client device 102 such that the display of the camera feed view 214 appears to follow the first user's finger across the touch screen display of the client device 102.

Software Architecture

Figure 9:
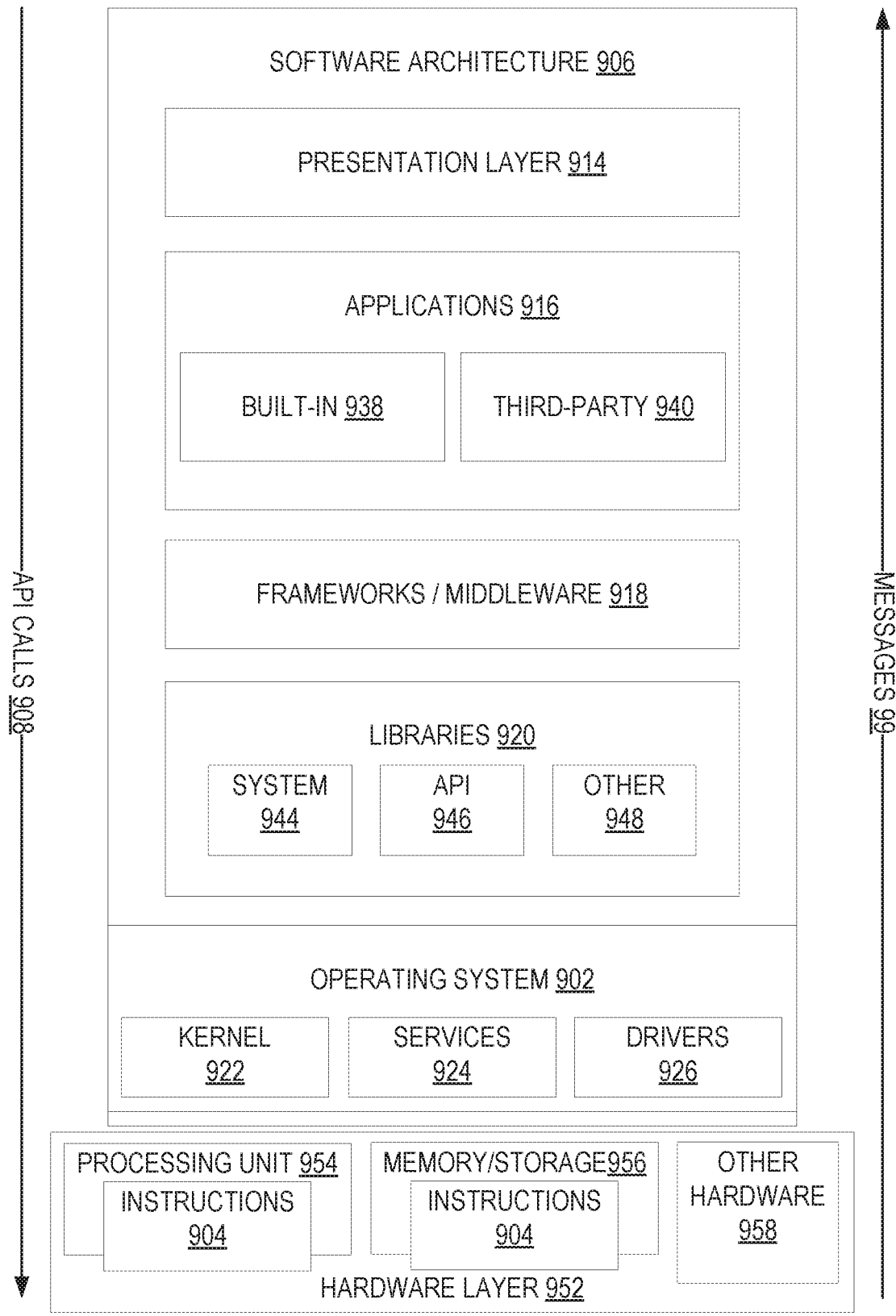
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes among other things, processors 1004, memory/storage 1006, and I/O components 1018. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage modules 956, which also have the executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response to the API calls 908 as messages 99. The layers illustrated are representative in nature and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.294. MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as the presentation layer 914. In these systems, the application/component "logic" can be separated from the aspects of the application/component that interact with a user.

Figure 10:
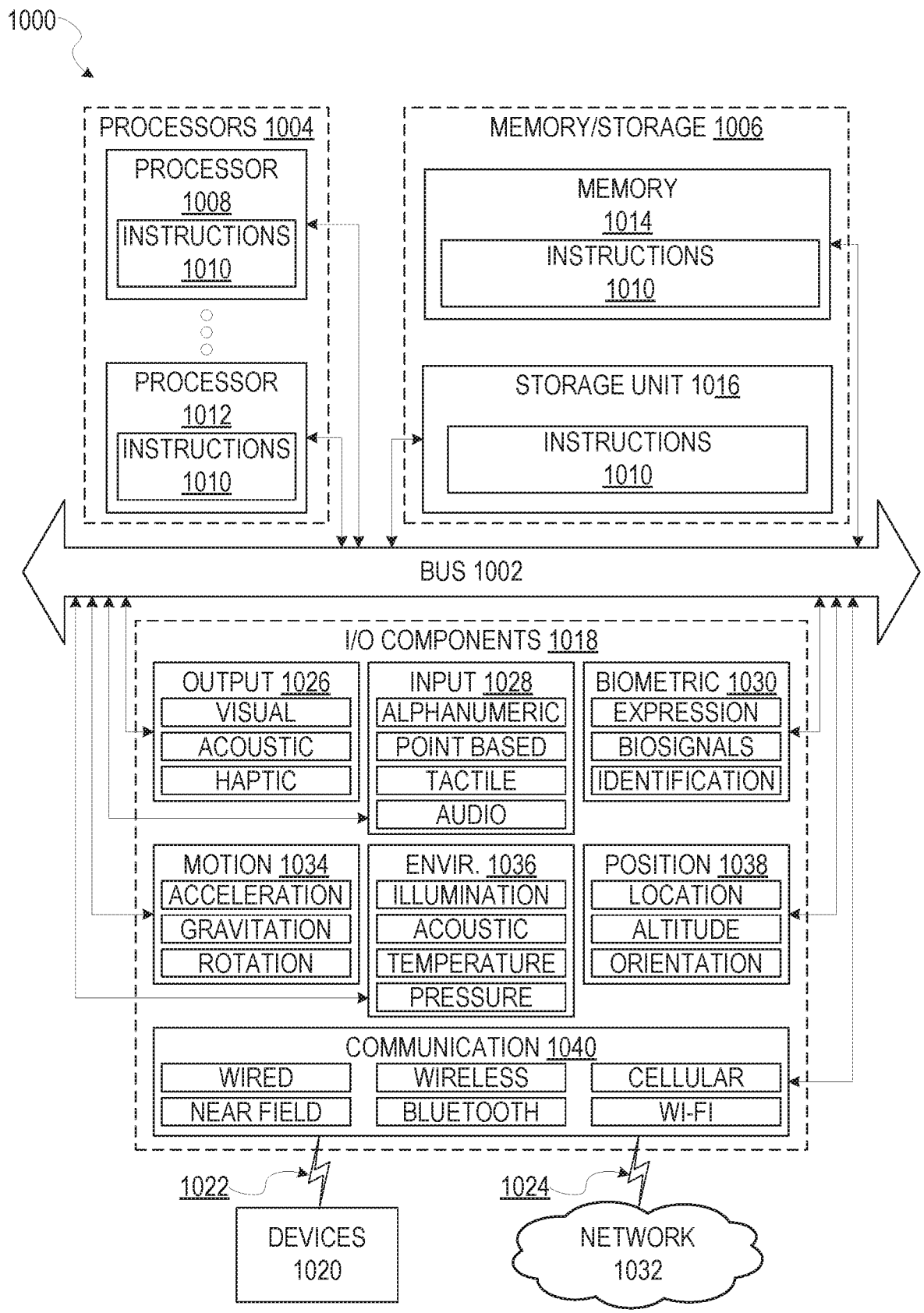
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically. FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. Although FIG. 10 shows multiple processors, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion, and the grouping is in no way limiting. In various example embodiments, the I/O components 1018 may include output components 1026 and input components 1028. The output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1018 may include biometric components 1030, motion components 1034, environment components 1036, or position components 1038, among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1038 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022, respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands." "op codes," "machine code." etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:

causing, by one or more hardware processors, display, on a touch screen display of a client device associated with a first user, of a conversation view that presents messages exchanged between the first user and at least one other user in an electronic chat conversation;

receiving a first user input comprising a first touch gesture corresponding to an interaction with the display of the conversation view on the touch screen display of the client device;

in response to receiving the first user input, causing, by the one or more hardware processors, display, on the client device associated with the first user, of an animation of a transition between the conversation view and a camera feed view, wherein the animation of the transition between the conversation view and the camera view comprises the camera view sliding across the touch screen display to appear to follow the first user input across the touch screen display while a display of a keyboard of the conversation view to slide down the touch screen display until the display of the keyboard is completely out of view, and display, on the client device associated with the first user, of the camera feed view, the camera feed view comprising a display of image data generated by a camera of the client device, the camera feed view enabling the first user to create a message comprising one or more images;

generating the message comprising the one or more images; and causing display of an indication of the message in the conversation view.

2. The method of claim 1, further comprising:
transitioning from the display of the camera feed view to the display of the conversation view.

3. The method of claim 2, further comprising:
receiving a second user input comprising a second touch gesture corresponding to an interaction with the display of the camera feed view on the touch screen display of the client device, wherein the transitioning from the display of the camera feed view to the display of the conversation view is based on receiving the second user input.

4. The method of claim 1, wherein the causing the display of the animation includes causing the display of the camera feed to slide across the touch screen display of the client device over the display of the conversation view.

5. The method of claim 1, wherein the first touch gesture comprises a swipe on the touch screen display across the display of the conversation view.

6. The method of claim 5, wherein the swipe on the touch screen display across the display of the conversation view enables the first user to reach the camera feed view directly from the conversation view.

7. The method of claim 1, wherein the enabling of the first user to create the message comprises:
enabling the first user to augment the display of the image data generated by the camera with one or more visual effects.

8. The method of claim 1, wherein:
the conversation view includes a first state indicator to indicate the display of the conversation view; and
the camera feed view includes a second state indicator to indicate the display of the camera feed view.

9. A system comprising:
one or more processors of a server machine; and
a computer-readable memory coupled to the one or more processors and storing instructions that, when executed by the one or more processors, cause the server machine to perform operations comprising:
causing display, on a touch screen display of a client device associated with a first user, of a conversation view that presents messages exchanged between the first user and at least one other user in an electronic chat conversation;
receiving a first user input comprising a first touch gesture corresponding to an interaction with the display of the conversation view on the touch screen display of the client device;
in response to receiving the first user input, causing
display, on the client device associated with the first user, of an animation of a transition between the conversation view and a camera feed view, wherein the animation of the transition between the conversation view and the camera view comprises the camera view sliding across the touch screen display to appear to follow the first user input across the touch screen display while a display of a keyboard of the conversation view to slide down the touch screen display until the display of the keyboard is completely out of view, and display, on the client device associated with the first user, of a camera feed view, the camera feed view comprising a display of image data generated by a camera of the client device, the camera feed view enabling the first user to create a message comprising one or more images;

generating the message comprising the one or more images; and causing display of an indication of the message in the conversation view.

10. The system of claim 9, wherein the operations further comprise:
transitioning from the display of the camera feed view to the display of the conversation view.

11. The system of claim 9, wherein the operations further comprise:
receiving a second user input comprising a second touch gesture corresponding to an interaction with the display of the camera feed view on the touch screen display of the client device, wherein the transitioning from the display of the camera feed view to the display of the conversation view is based on receiving the second user input.

12. The system of claim 9, wherein the causing the display of the animation includes causing the display of the camera feed to slide across the touch screen display of the client device over the display of the conversation view.

13. The system of claim 9, wherein the first touch gesture comprises a swipe on the touch screen display across the display of the conversation view.

14. The system of claim 9, wherein the enabling of the first user to create the message comprises:
enabling the first user to augment the display of the image data generated by the camera with one or more visual effects.

15. A non-transitory computer-readable medium storing instructions that, when executed by a computer system, cause the computer system to perform operations comprising:
causing display, on a touch screen display of a client device associated with a first user, of a conversation view that presents messages exchanged between the first user and at least one other user in an electronic chat conversation;
receiving a first user input comprising a first touch gesture corresponding to an interaction with the display of the conversation view on the touch screen display of the client device;
in response to receiving the first user input, causing
display, on the client device associated with the first user, of an animation of a transition between the conversation view and a camera feed view, wherein the animation of the transition between the conversation view and the camera view comprises the camera view sliding across the touch screen display to appear to follow the first user input across the touch screen display while a display of a keyboard of the conversation view to slide down the touch screen display until the display of the keyboard is completely out of view, and display, on the client device associated with the first user, of a camera feed view, the camera feed view comprising a display of image data generated by a camera of the client device, the camera feed view enabling the first user to create a message comprising one or more images;

generating the message comprising the one or more images; and causing display of an indication of the message in the conversation view.

16. The non-transitory computer-readable medium of claim 15, wherein the causing the display of the animation includes causing the display of the camera feed view to slide across the touch screen display of the client device over the display of the conversation view.

17. The non-transitory computer-readable medium of claim 15, wherein:

the first touch gesture comprises a swipe on the touch screen display across the display of the conversation view; and the camera feed view slides across the touch screen display in a manner that follows the swipe on the touch screen display.

18. The non-transitory computer-readable medium of claim 15, wherein the operations further comprise:

causing display of an animation of a transition between the display of the camera feed view and the conversation view.

* * * * *